(12) United States Patent
Marxen et al.

(10) Patent No.: US 7,191,029 B2
(45) Date of Patent: Mar. 13, 2007

(54) RAPID PROTOTYPE FABRICATION OF A MONOLITHIC HEARING INSTRUMENT HOUSING WITH AN INTEGRALLY-FABRICATED FACEPLATE

(75) Inventors: Christopher Marxen, Stewartsville, NJ (US); Martin W. Masters, Hillsborough, NJ (US)

(73) Assignee: Siemens Hearing Instruments, Inc., Piscataway, NJ (US)

( * ) Notice: Subject to any disclaimer, the term of this patent is extended or adjusted under 35 U.S.C. 154(b) by 574 days.

(21) Appl. No.: 10/385,593

(22) Filed: Mar. 11, 2003

(65) Prior Publication Data

US 2003/0152242 A1 Aug. 14, 2003

Related U.S. Application Data

(63) Continuation-in-part of application No. 09/887,939, filed on Jun. 22, 2001.

(51) Int. Cl.
G06F 19/00 (2006.01)

(52) U.S. Cl. ...................... 700/118; 381/322

(58) Field of Classification Search ............... 700/98, 700/117, 118; 381/312, 322; 623/10
See application file for complete search history.

(56) References Cited

U.S. PATENT DOCUMENTS

| 6,879,697 B2 * | 4/2005 | Topholm ............... 381/322 |
| 2003/0074174 A1 * | 4/2003 | Fu et al. ............... 703/13 |
| 2005/0169492 A1 * | 8/2005 | Topholm ............... 381/322 |

FOREIGN PATENT DOCUMENTS

| EP | 1 246 506 | 3/2001 |
| GB | 2344556 | * 7/1999 |
| WO | WO 01/05207 | 1/2001 |
| WO | WO 02/071794 | 9/2002 |

\* cited by examiner

Primary Examiner—Albert W. Paladini
(74) Attorney, Agent, or Firm—Joel Miller; Mark H. Jay

(57) ABSTRACT

The benefits of rapid modeling and prototyping of a hearing instrument housing can be increased by fashioning the housing as a monolithic unit, incorporating the faceplate as an integral part of the housing. An opening in the faceplate region of the housing can be created to accept a module containing various electronic components of the hearing instrument.

13 Claims, 14 Drawing Sheets

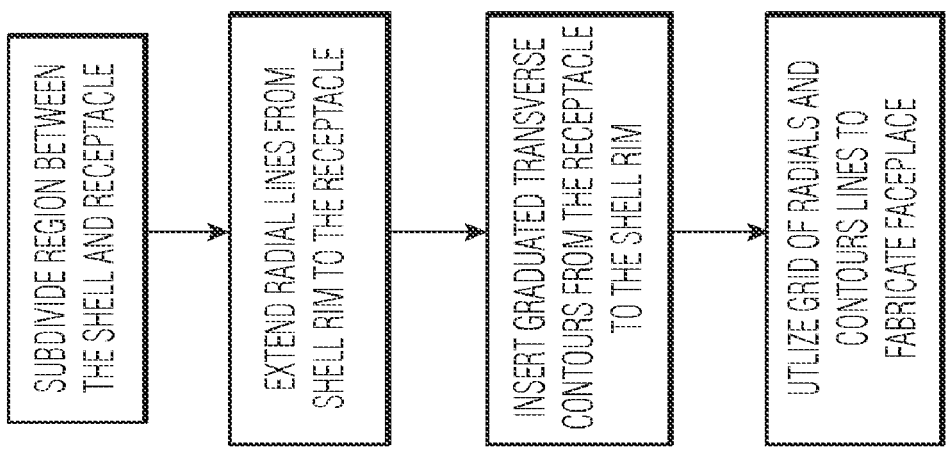

RAPID PROTOTYPE FABRICATION OF A MONOLITHIC HEARING INSTRUMENT HOUSING WITH AN INTEGRALLY-FABRICATED FACEPLATE

CROSS-REFERENCE TO RELATED APPLICATION

This application is a continuation-in-part of U.S. patent application Ser. No. 09/887,939 filed Jun. 22, 2001, incorporated by reference herein.

BACKGROUND AND SUMMARY OF THE INVENTION

The procedure for fabricating a hearing instrument using rapid prototyping methods is described in the patent application noted above. In that application, reference is made to an integral faceplate. Instead of a separately fabricated element, the hearing instrument housing can be fabricated as a monolithic unit having an integral faceplate, such that the faceplate is no longer a separate element. The housing would have an opening in the vicinity of the location where a faceplate would otherwise be attached and a module, containing the various electrical components of the instrument, would be inserted in the opening.

BRIEF DESCRIPTION OF THE DRAWINGS

FIG. 14 is a flow chart of a process for creating a transition surface between a hearing instrument shell and a receptacle in the faceplate of the hearing instrument.

DESCRIPTION OF THE INVENTION

Figure 1:
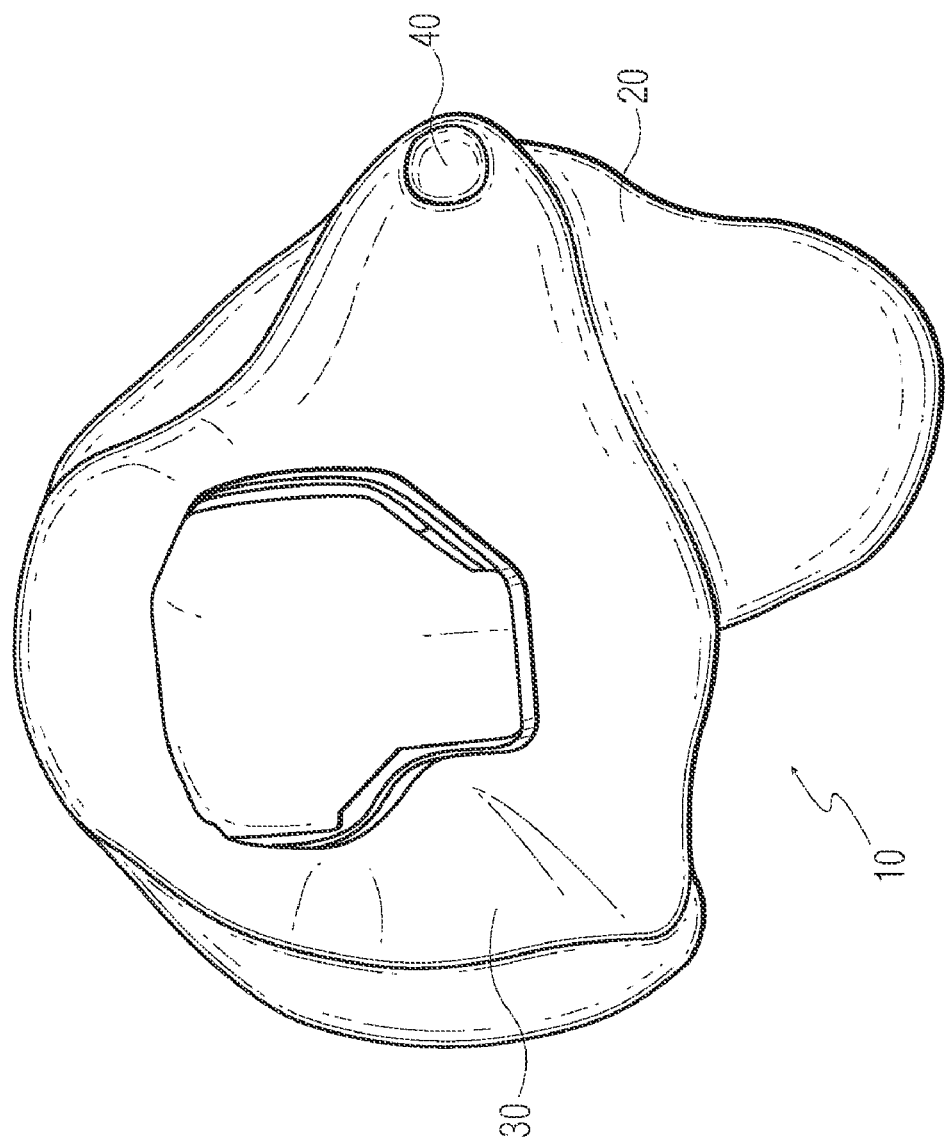
FIG. 1 is a drawing of a monolithic hearing instrument housing.

As discussed in detail in U.S. application Ser. No. 09/887,939, a hearing instrument housing or body 10 can be manufactured using rapid prototyping or direct manufacture techniques. One portion of the housing 10, a shell 20, partially resides in the concha or bowl of the ear—the area just outside of the ear canal. Depending on the type of instrument (completely within the ear canal, extending partially out of the canal, or occupying more of the outer ear, as discussed in U.S. application Ser. No. 09/887,939), the shell 20 may extend into the concha or barely extend into the ear canal or reside completely within the ear canal.

The shell 20 conforms to the user's ear canal and optionally a portion of the ear external to the ear canal. It may be created from a digital representation obtained by directly scanning the user's ear canal and, to the extent necessary, any portion of the ear external to the ear canal, or an impression of the desired portion of the ear.

The remaining portion of the housing 10, the faceplate or outer section 30, is oriented to the outside and constitutes in part the outwardly-visible portion of the hearing instrument. Because it is largely exposed to the outside, the outer section 30 can assume any desired shape and contour. Finally, there is a vent 40, which allows air flow through the hearing instrument.

Figure 2:
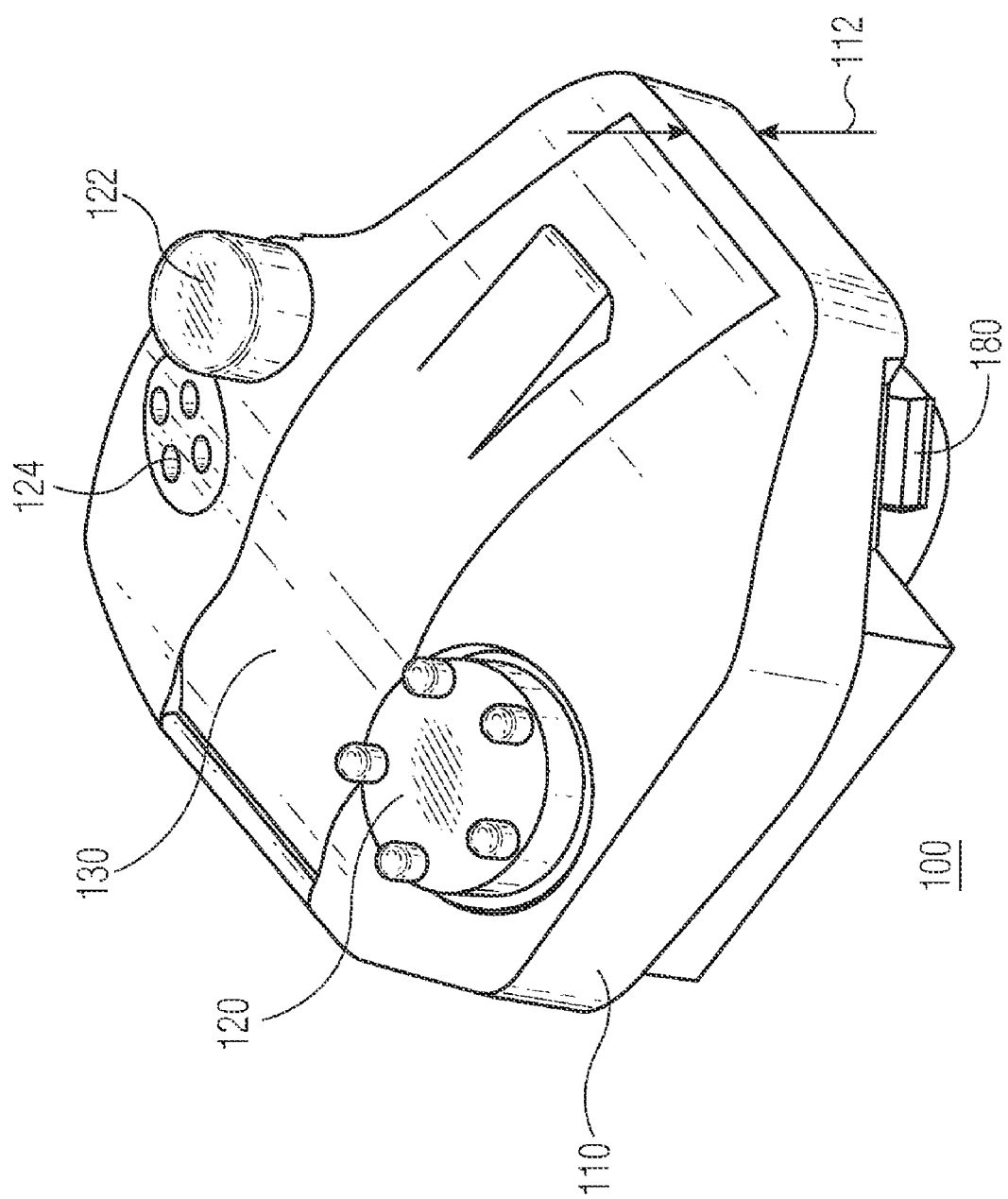
FIGS. 2 and 3 are drawings of a component module for the hearing instrument housing of FIG. 1.
Figure 3:
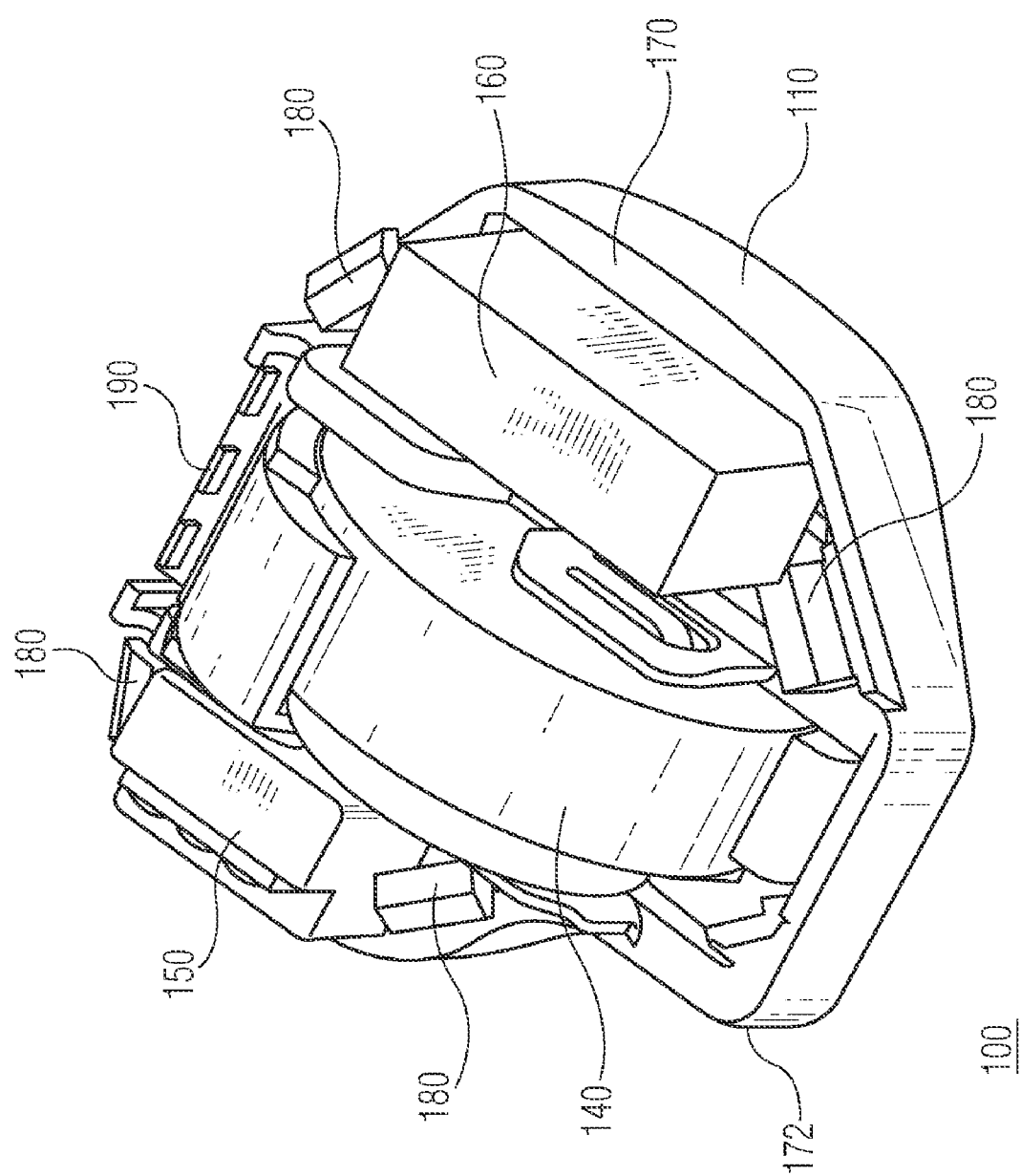

A component module 100 for the housing 10 is shown in FIGS. 2 and 3. As noted previously, it may contain a microphone, battery, and an amplifier. A volume control 120, a push button 122, a microphone port 124, and a battery door 130 are visible in FIG. 2, illustrating the surface of the module 100 oriented to the outside of the housing 10. FIG. 3 illustrates the "internal" or "underside" view of the module 100, showing a battery 140, a microphone 150, an amplifier 160, and programming contacts 190. The module 100 has a base 170 that may be provided with a rounded or beveled edge 172.

FIGS. 2 and 3 illustrate just one selection and arrangement of components; other combinations and arrangements of components, internal and external, could be used as desired. The module 100 can assume any desired shape and dimensions necessary to accommodate the components employed, taking into account the shape and size of the housing 10.

Figure 4:
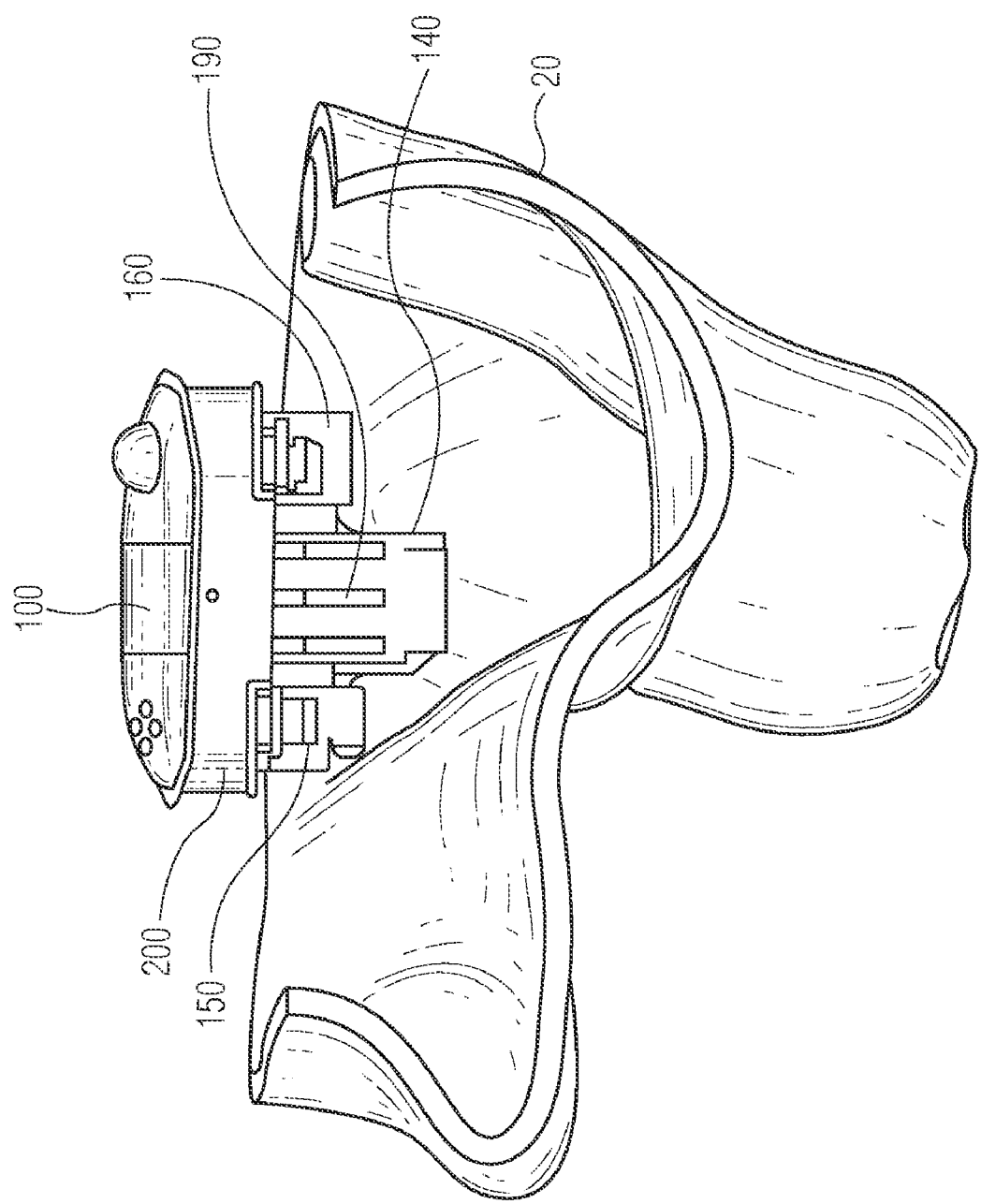
FIG. 4 illustrates the co-location of a component module and a mating receptacle with respect to a hearing instrument shell.
Figure 5:
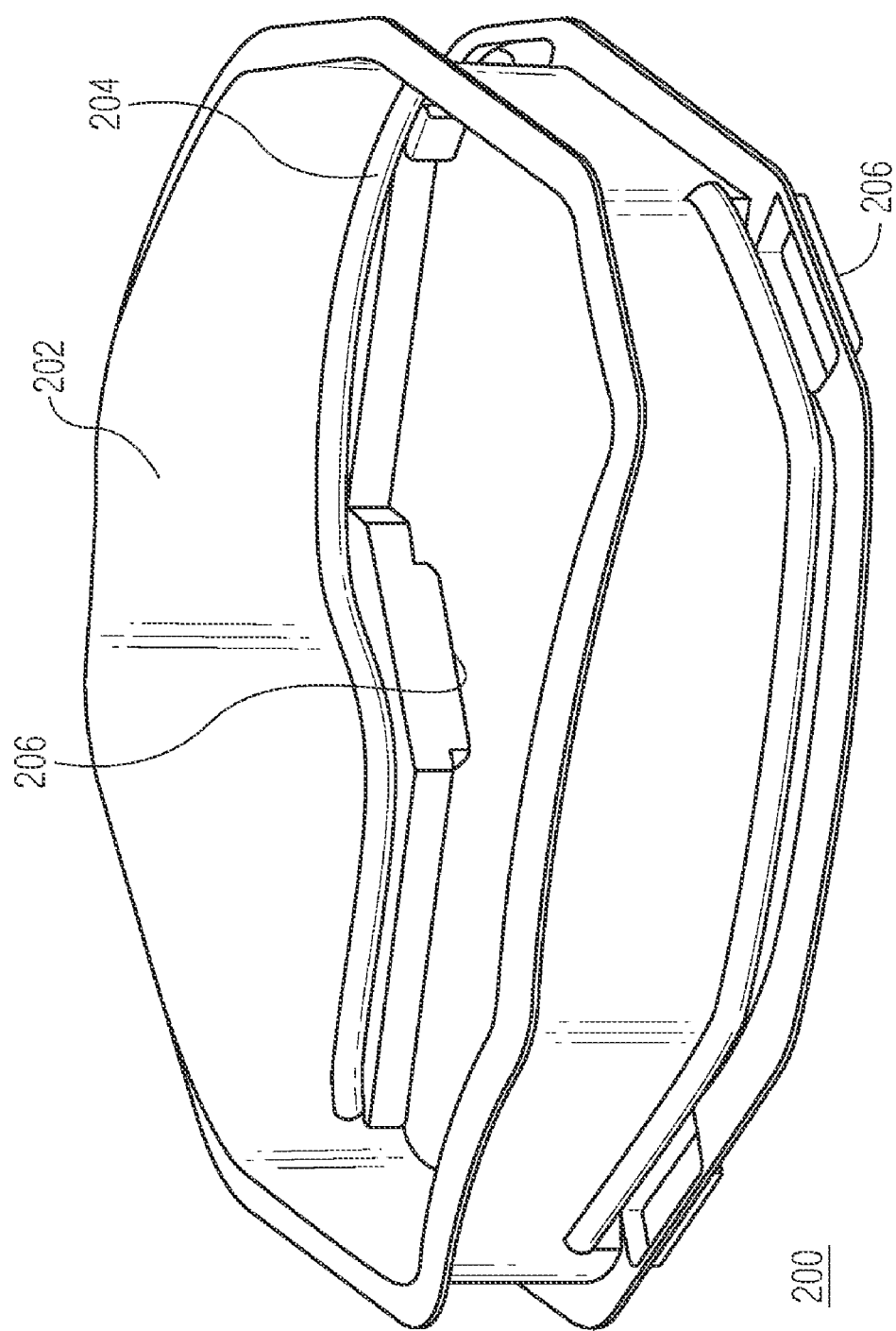
FIG. 5 is a drawing of a mating receptacle for the component module.

The module 100 provides a reference structure for creating a surrounding receptacle 200 in the housing 10 into which the module 100 is inserted after the housing 10 has been completed (see the receptacle illustrated 200 in FIGS. 4 and 5). Thus, the exterior of the module 100 and the interior of the receptacle 200 will have complementary mating features. Although it appears to be a separate element in the figures, the receptacle 200 will be an integral part of the housing 10 after fabrication has been completed.

Given the module 100 illustrated in FIGS. 2 and 3, with a vertical peripheral wall 110 having a height 112 that varies along the periphery of the module 100, the receptacle 200 will have a corresponding inner wall 202, as shown in FIG. 5. The dimensions of the interior surfaces of the receptacle 200 can be slightly larger than the module 100 to allow insertion into the receptacle 200 without excessive force.

Working with the digital representations of the shell 20 and the module 100, the module 100 and the mating receptacle 200 are positioned in three-dimensional space where desired relative to the shell 20 of the hearing instrument housing 10, as illustrated in FIG. 4. This can be at any location, bearing in mind that the components on the component module 100 must clear the inside of the housing 10. One of the larger components is the battery 140, which in this figure protrudes downwardly. Also visible in this view are the microphone 150 and the amplifier 160. This clearance with respect to the housing 10 may be assured by using a collision avoidance technique such as that discussed in U.S. application Ser. No. 09/887,939.

As shown in FIG. 5, a ledge 204 may be provided around the inside base of the receptacle 200 to provide a seat for the base 170 of the module 100 (see FIG. 3). Protruding from the base 170 are one or more spring latches 180 which secure behind the ledge 204 of the receptacle 200. Although four such latches 180 are shown in FIG. 3, the actual number employed is a matter of design choice. A rounded or beveled edge 172 of the module 100 facilitates easier insertion and seating in the receptacle 200. As an additional enhancement, the ledge 204 may have downward extensions 206 to allow for latches 180 of longer length and greater spring action.

Figure 6:
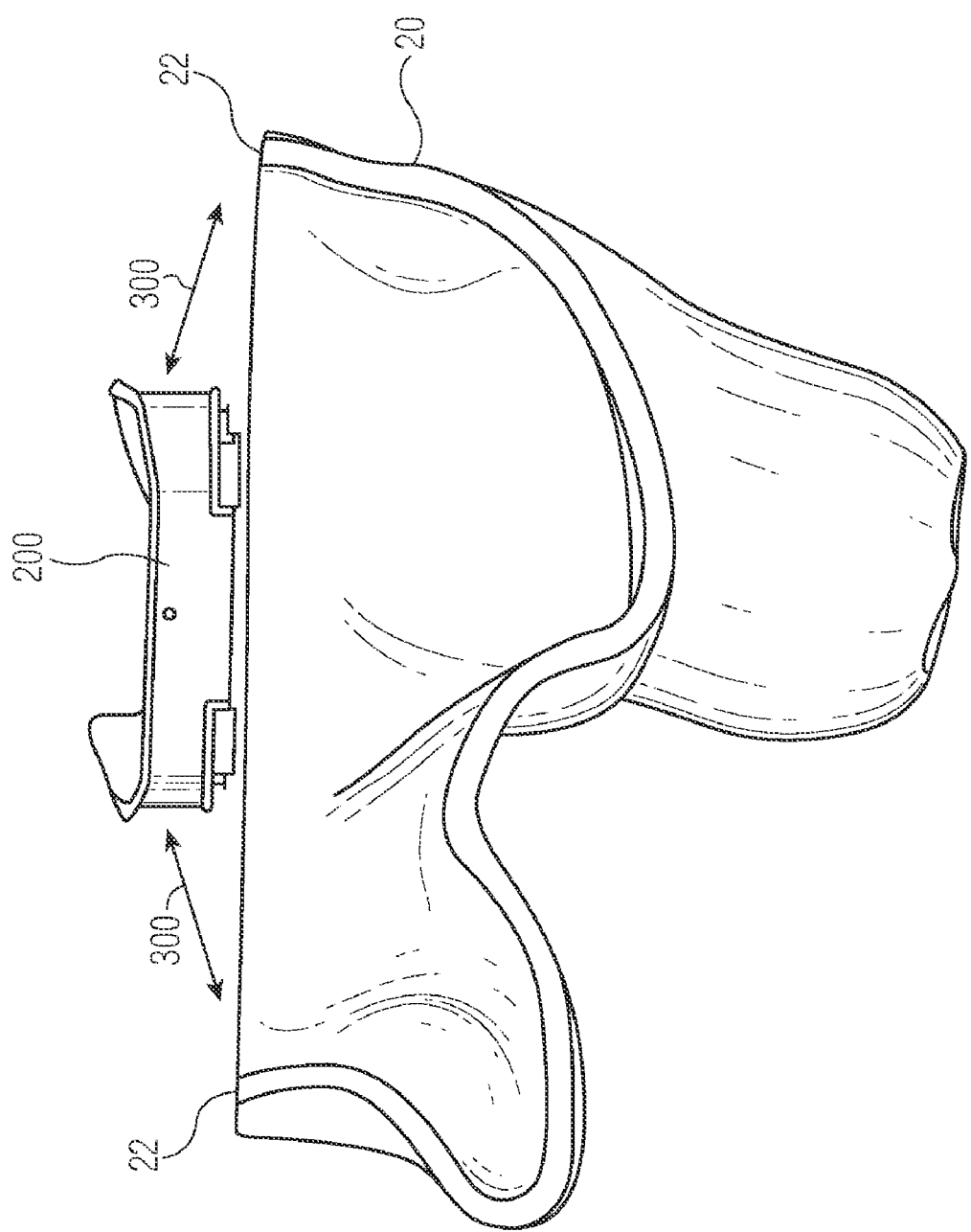
FIG. 6 illustrates the hearing instrument shell of FIG. 4 and the mating receptacle.
Figure 13:
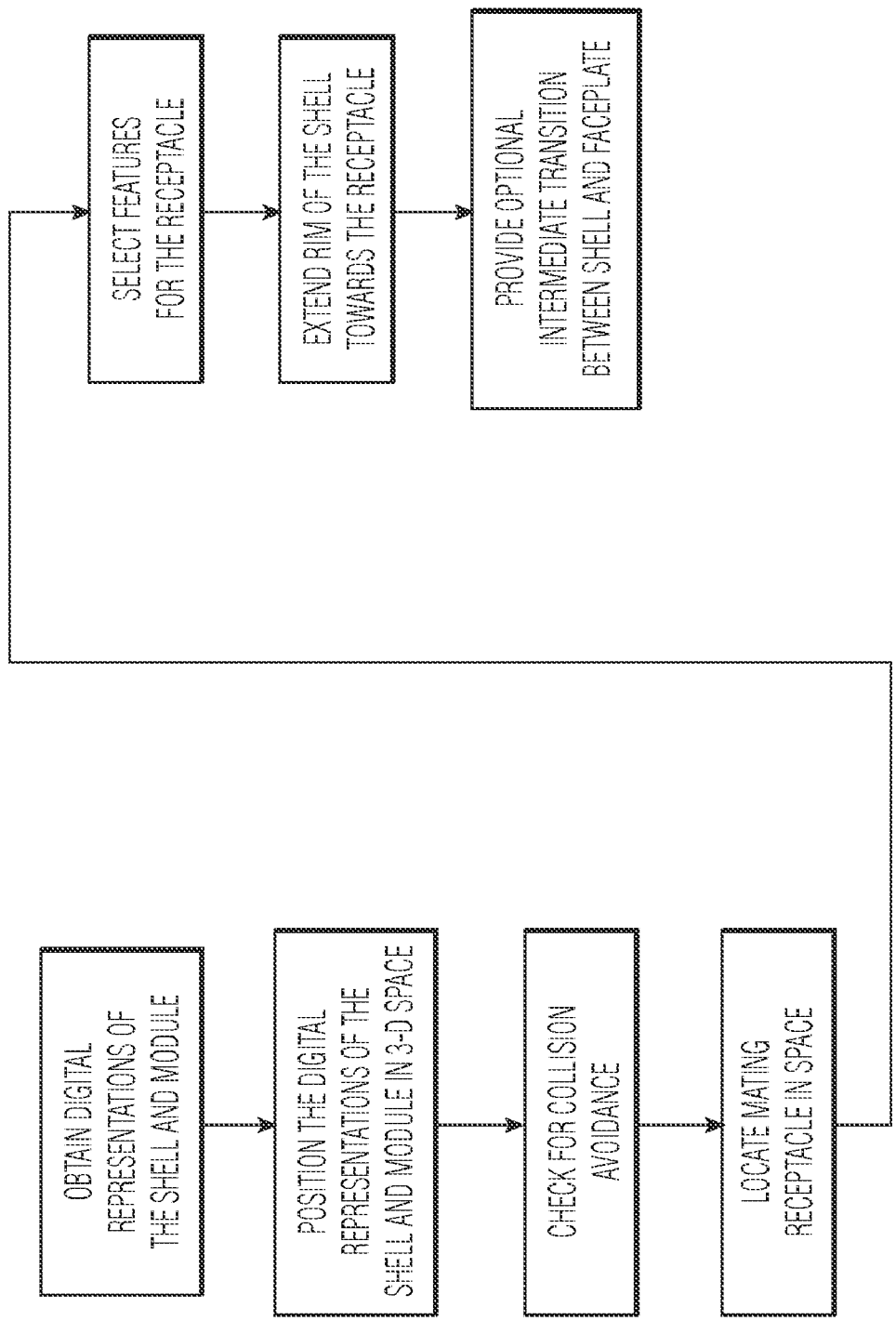
FIG. 13 is a flow chart of a process for fabricating a hearing instrument housing.

The housing 10 is then completed by extending the rim 22 of the shell 20 towards the receptacle 200 (FIG. 6). (Alternatively, the receptacle 200 could be extended towards the shell 20.) The shell 20 and the receptacle 200 are thus merged, to create the outer section 30 between the shell 20 and the receptacle 200 (see FIG. 1). This outer section 30 may be curved to provide a smooth transition surface from the shell 20 to the receptacle 200. The foregoing process for fabricating a hearing instrument housing is set forth in the flow chart in FIG. 13.

Figure 7:
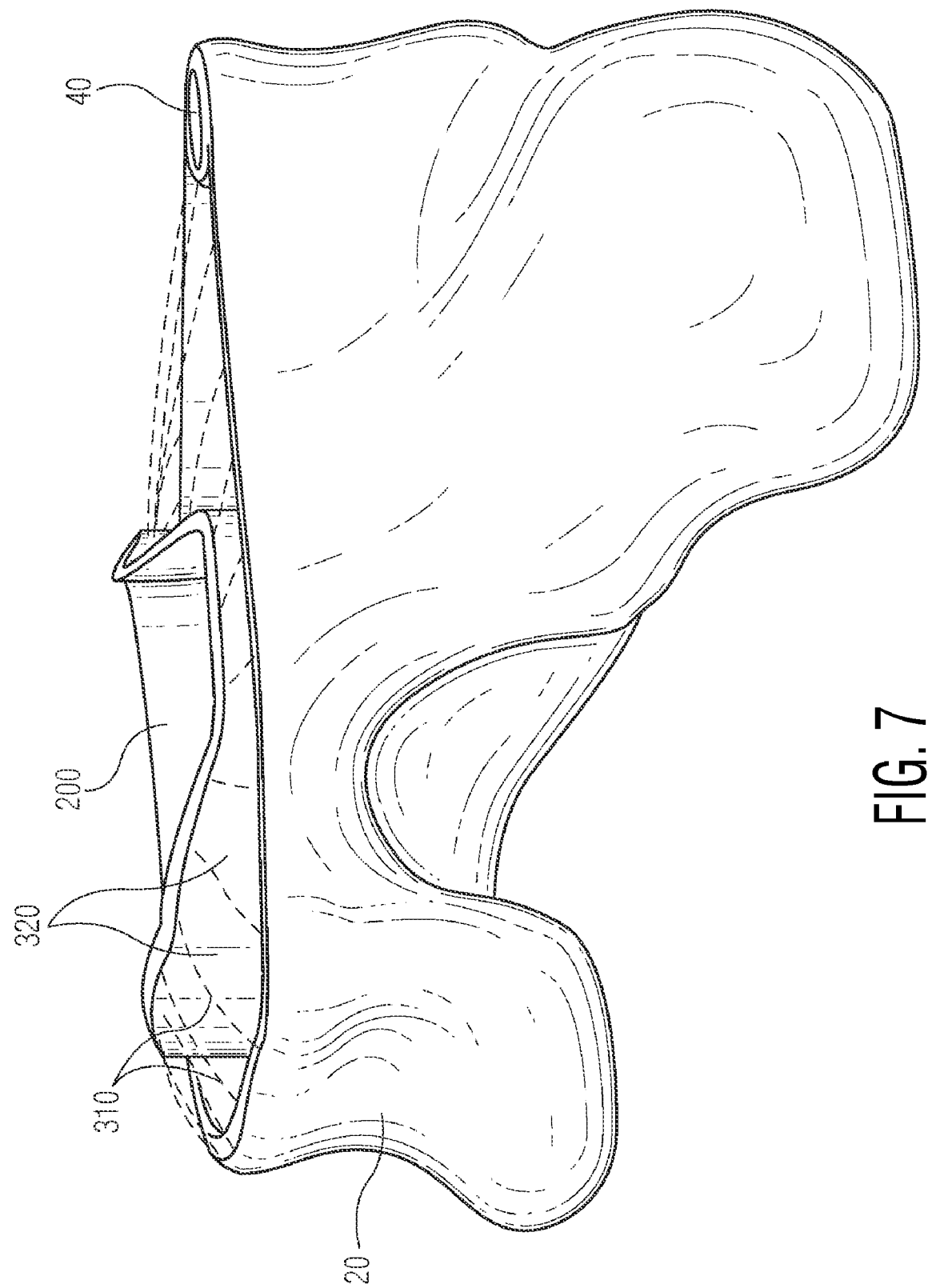
FIGS. 7 and 8 illustrate the co-location of the receptacle for the component module with respect to the hearing instrument shell and a grid of radial lines for completing the fabrication of the hearing instrument housing.
Figure 8:
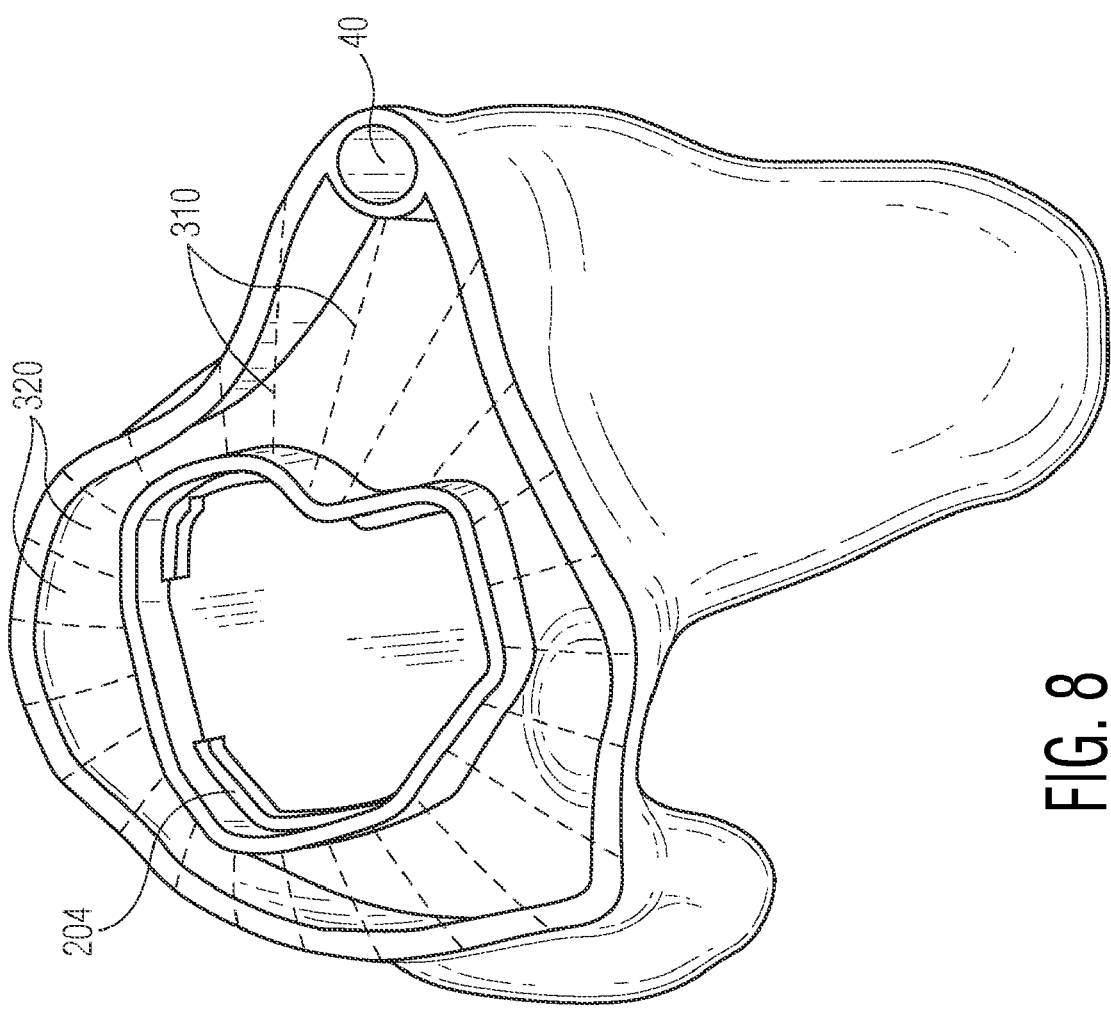

One method of achieving this transition is to subdivide the region 300 between the shell 20 and the receptacle 200 (FIG. 6). This can be done by extending radial lines 310 from the shell rim 22 to the receptacle 200 (see FIGS. 7 and 8), creating a series of segments 320. The radial lines 310 may be straight lines, elliptical curves, or any other suitable curve.

Figure 9:
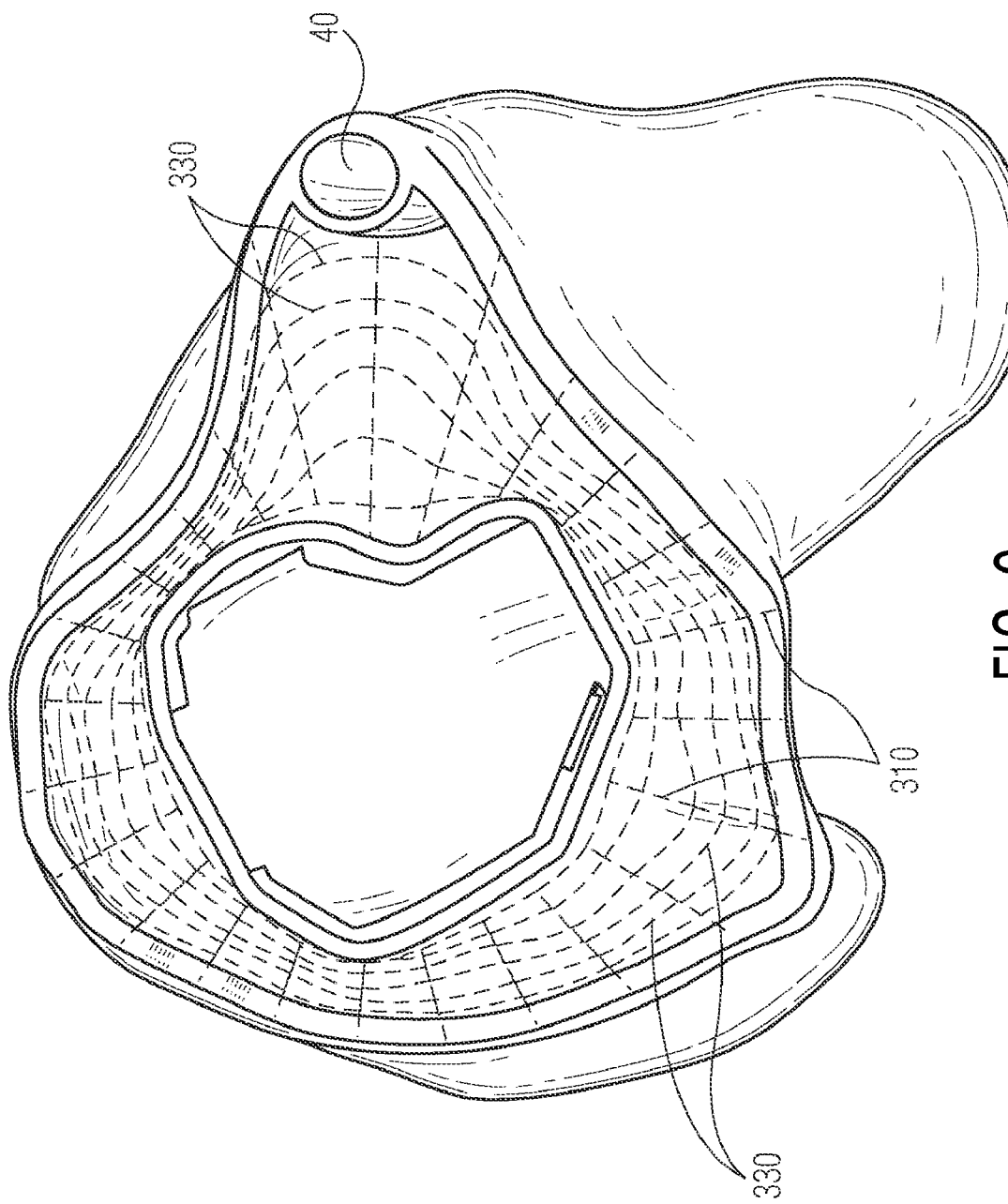
FIGS. 9 and 10 illustrate a grid of radial and contour lines for completing the fabrication of the hearing instrument housing.
Figure 10:
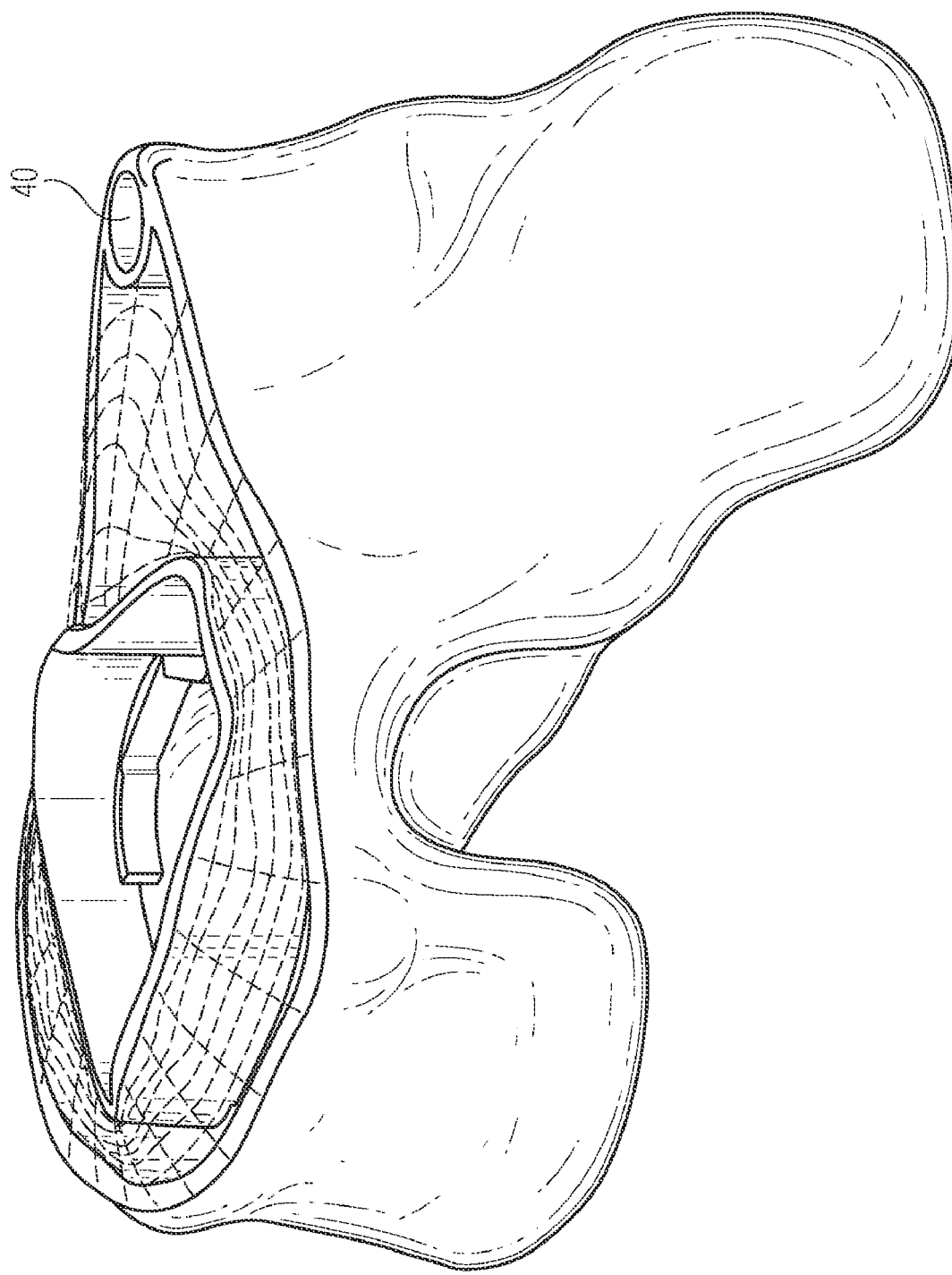

The segments 320 could then be divided by drawing a series of graduated transverse contours 330 that span the region 300 from the receptacle 200 to the shell rim 22 (see FIGS. 9 and 10). The contours 330 near the receptacle 200 would conform to the periphery of the receptacle 200 while those nearest the rim 22 would conform to that shape. The number of radials 310 and contour lines 330 can be as many as necessary to achieve the desired smoothness of the surface between the shell 20 and the receptacle 200.

Figure 11:
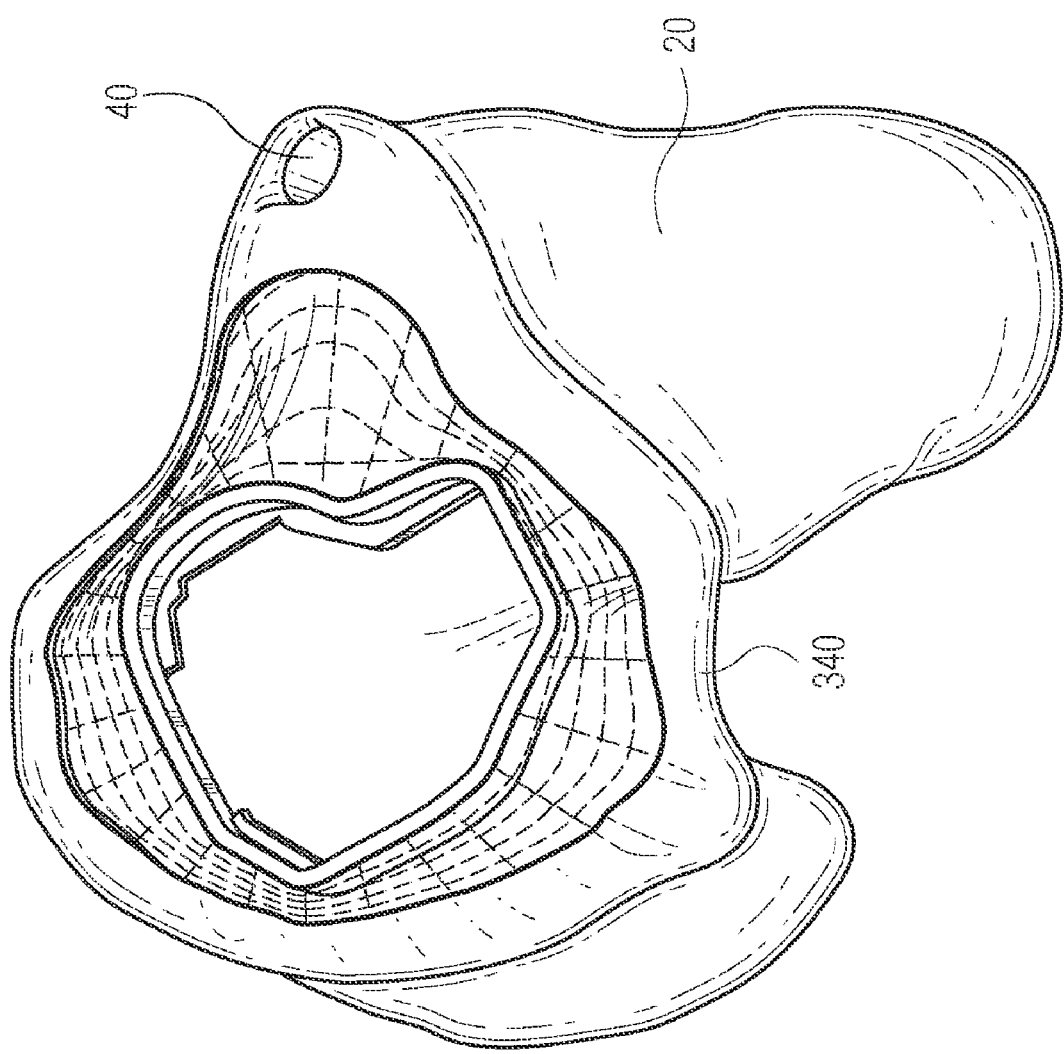
FIG. 11 illustrates a partially-complete hearing instrument housing.
Figure 12:
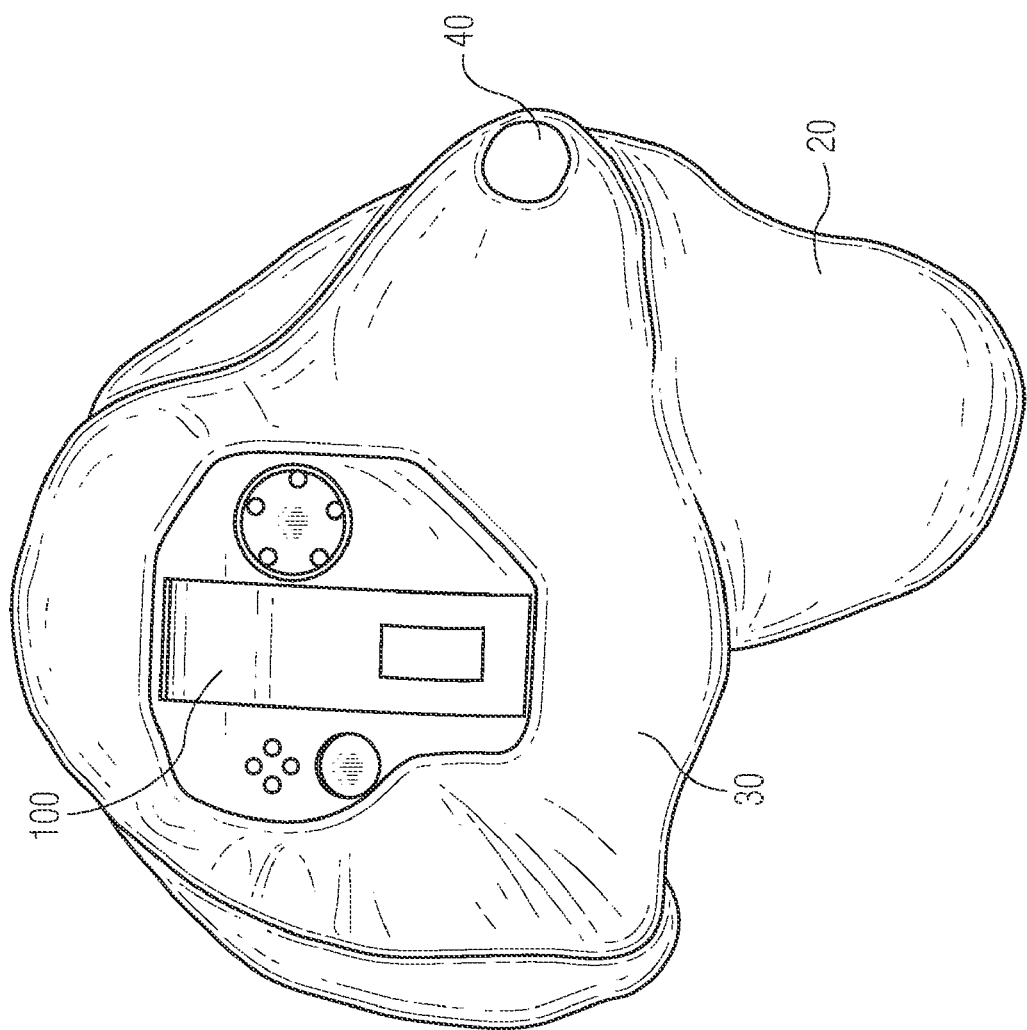
FIG. 12 illustrates a complete hearing instrument housing with a component module inserted therein.

The grid of radials 310 and contour lines 330 provides a framework for filling in the housing 10 using the rapid prototyping process discussed in U.S. application Ser. No. 09/887,939. he process of gradually completing the housing 10 is illustrated in FIG. 11 and a completed housing 10 is shown in FIG. 12. When fabricated, the housing 10 can have a thickness in the vicinity of the receptacle 200 generally equal to the height of the receptacle 200.

When the region 300 is fabricated, allowance must be made for the vent 40, also visible in FIGS. 7–12. Thus, the surface must also provide an opening to allow for a continuation of the vent 40 to the outside.

As can be seen from FIGS. 4, 7, 8, and 10, the melding of the shell 20 and outer section 30 could result in a sharp edge at the rim 22. Thus, an intermediate transition surface 340, such as a bevel, fillet, chamfer, or some other modification can be fashioned at the junction of these two components. The foregoing process for creating a transition surface between a hearing instrument shell and a receptacle in the faceplate of the hearing instrument is set forth in the flow chart in FIG. 14.

What is claimed is:

1. A method for fabricating a housing for a hearing instrument, comprising:
    obtaining a digital representation of at least a portion of an ear canal and optionally a portion of the ear external to the ear canal;
    creating a digital representation of a shell conforming to at least a portion of the digital representation of the ear canal and optionally a portion of the ear external to the ear canal;
    creating a digital representation of a monolithic housing, incorporating the digital representation of the shell; and
    superpositioning a digital representation of an electronics module and a mating receptacle with respect to the digital representation of the shell.

2. A method as set forth in claim 1, further comprising fabricating a monolithic housing from the digital representation of the monolithic housing.

3. A method as set forth in claim 1, where fabricating a monolithic housing comprises fabricating the housing by rapid prototyping or direct manufacture.

4. A method as set forth in claim 1, where superpositioning a digital representation of an electronics module and a mating receptacle comprises testing for collision avoidance between the electronics module and the digital representation of the shell.

5. A monolithic hearing instrument housing fabricated utilizing the method of claim 1.

6. A method for fabricating a housing for a hearing instrument, comprising:
    obtaining a digital representation of at least a portion of an ear canal and optionally a portion of the ear external to the ear canal;
    creating a digital representation of a shell conforming to at least a portion of the digital representation of the ear canal and optionally a portion of the ear external to the ear canal;
    creating a transition region between the digital representation of the shell and the receptacle, where creating a transition region comprising fixing a series of graduated contours between the receptacle and the digital representation of the shell; and
    creating a digital representation of a monolithic housing, incorporating the digital representation of the shell.

7. A method as set forth in claim 6, where fixing a series of graduated contours between the receptacle and the digital representation of the shell comprises fixing a plurality of radial lines between the receptacle and the digital representation of the shell.

8. A method as set forth in claim 7, where fixing a plurality of radial lines between the receptacle and the digital representation of the shell comprises fixing a plurality of elliptical, straight, or curved lines.

9. A method as set forth in claim 6, further comprising creating an intermediate transition between the transition region and the digital representation of the shell, where the intermediate transition is rounded, elliptical, straight, curved, or of some other shape.

10. A method as set forth in claim 6, further comprising fabricating a monolithic housing from the digital representation of the monolithic housing.

11. A monolithic hearing instrument housing fabricated utilizing the method of claim 6.

12. A method for fabricating a housing for a hearing instrument, comprising:
    obtaining a digital representation of at least a portion of an ear canal and optionally a portion of the ear external to the ear canal;
    creating a digital representation of a shell conforming to at least a portion of the digital representation of the ear canal and optionally a portion of the ear external to the ear canal;
    superpositioning a digital representation of an electronics module and a mating receptacle with respect to the digital representation of the shell;
    creating a transition region between the digital representation of the shell and the receptacle, where creating a transition region comprising fixing a series of graduated contours between the receptacle and the digital representation of the shell;

creating an intermediate transition between the transition region and the digital representation of the shell, where the intermediate transition is rounded, elliptical, straight, curved, or of some other shape; and creating a digital representation of a monolithic housing, incorporating the digital representation of the shell, the receptacle, the transition region, and the intermediate transition; and fabricating a monolithic housing from the digital representation of the housing by rapid prototyping or direct manufacture.

13. A monolithic hearing instrument housing fabricated utilizing the method of claim 12.

\* \* \* \* \*